United States Patent
Zhang

(10) Patent No.: US 9,576,225 B2
(45) Date of Patent: Feb. 21, 2017

(54) ELECTRONIC CARD CONNECTOR HAVING EJECTING MECHANISM

(71) Applicant: FOXCONN INTERCONNECT TECHNOLOGY LIMITED, Grand Cayman (KY)

(72) Inventor: Wei-De Zhang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/599,457

(22) Filed: Jan. 17, 2015

(65) Prior Publication Data

US 2015/0207270 A1    Jul. 23, 2015

(30) Foreign Application Priority Data

Jan. 17, 2014 (CN) .......................... 2014 1 0021397

(51) Int. Cl.
*G06K 13/08* (2006.01)
*H01R 13/635* (2006.01)

(52) U.S. Cl.
CPC ........... *G06K 13/0831* (2013.01); *G06K 13/08* (2013.01); *G06K 13/0812* (2013.01); *H01R 13/635* (2013.01)

(58) Field of Classification Search
CPC .. G06K 13/08; G06K 13/085; G06K 13/0806; G06K 13/0812; G06K 13/0825; G06K 13/0831; H01R 13/635
USPC .................................................. 439/159, 153
See application file for complete search history.

(56) References Cited

U.S. PATENT DOCUMENTS

| | | | |
|---|---|---|---|
| 6,814,597 B1 | 11/2004 | Kao | |
| 8,100,722 B2* | 1/2012 | Hu | G06K 7/0021 |
| | | | 439/352 |
| 8,147,262 B1* | 4/2012 | Su | G06K 13/0825 |
| | | | 439/159 |
| 8,292,642 B1* | 10/2012 | Lee | G06K 7/0026 |
| | | | 439/159 |
| 8,303,322 B1* | 11/2012 | Little | G06K 13/0825 |
| | | | 439/159 |

(Continued)

FOREIGN PATENT DOCUMENTS

| | | |
|---|---|---|
| TW | M422782 | 2/2012 |
| TW | M432992 | 7/2012 |
| TW | M465684 | 11/2013 |

*Primary Examiner* — Amy Cohen Johnson
*Assistant Examiner* — Oscar C Jimenez
(74) *Attorney, Agent, or Firm* — Wei Te Chung; Ming Chieh Chang

(57) ABSTRACT

An electronic card connector (100) includes an insulative housing (1), a plurality of terminals (2) retained in the insulative housing, a tray (5) movable between an original position and a final position and having a notch (51) and a stepping part (52), a shielding shell (4) having an elastic part (43), and an ejecting mechanism (6). The elastic part has a holding part (432) for latching with the stepping part at a final position. The ejecting mechanism has a lever (62) including a buckling portion (624) and a spring (61) cooperated with the lever. The lever is movable forwardly against with the spring to disengage the holding part from the stepping part and to plunge the buckling portion into the notch, thereby permitting the tray together with the lever to return to the original position under a restoring force provided by the spring.

8 Claims, 7 Drawing Sheets

(56) References Cited

U.S. PATENT DOCUMENTS

| | | | |
|---|---|---|---|
| 8,376,764 B1* | 2/2013 | Su | G06K 13/0831 |
| | | | 439/157 |
| 8,419,454 B1* | 4/2013 | Ji | G06K 7/0021 |
| | | | 439/159 |
| 8,460,019 B2* | 6/2013 | Lai | G06K 13/08 |
| | | | 439/159 |
| 8,460,021 B1* | 6/2013 | Lee | G06K 13/08 |
| | | | 439/159 |
| 9,083,438 B2* | 7/2015 | Tsai | G06K 7/0069 |
| 2010/0130040 A1* | 5/2010 | Matsunaga | H05K 5/0295 |
| | | | 439/159 |
| 2015/0263452 A1* | 9/2015 | Zhang | G06K 13/0831 |
| | | | 439/153 |

* cited by examiner

ELECTRONIC CARD CONNECTOR HAVING EJECTING MECHANISM

BACKGROUND OF THE INVENTION

1. Field of the Invention

The present invention relates generally to an electronic card connector, and more particularly to an electronic card connector having an ejecting mechanism. This application relates to the copending application Ser. No. 14/598,179 filed Jan. 15, 2015.

2. Description of Related Arts

Taiwan Patent No. M432992 discloses an electronic card connector including a housing, an ejector, a metal shell, and a card-carrying tray. The ejector includes a cam, a slider, and a lever. The metal shell has an elastic part splitting from a top wall thereof and extending downwardly to press and stably position the inserted tray.

U.S. Pat. No. 6,814,597 discloses a card connector having an ejector designed for working with a Subscriber Identity Module (SIM) card. The ejector comprises a slider which moves together with a thin SIM card to be inserted or rejected, a push rod, and a pivotable lever coupled between the slider and the push rod. In order to effectuate a pivoting movement, the pivotable lever needs a large space.

An electronic card connector having an improved ejecting mechanism is desired.

SUMMARY OF THE INVENTION

Accordingly, an object of the present invention is to provide an electronic card connector having an ejecting mechanism to attain efficient and safe ejection.

To achieve the above object, An electronic card connector includes an insulative housing, a plurality of terminals retained in the insulative housing, a tray movable between an original position and a final position and having a notch and a stepping part, a shielding shell having an elastic part, and an ejecting mechanism. The elastic part has a holding part for latching with the stepping part at a final position. The ejecting mechanism has a lever including a buckling portion and a spring cooperated with the lever. The lever is movable forwardly against with the spring to disengage the holding part from the stepping part and to plunge the buckling portion into the notch, thereby permitting the tray together with the lever to return to the original position under a restoring force provided by the spring.

DETAILED DESCRIPTION OF THE PREFERRED EMBODIMENT

Figure 1:
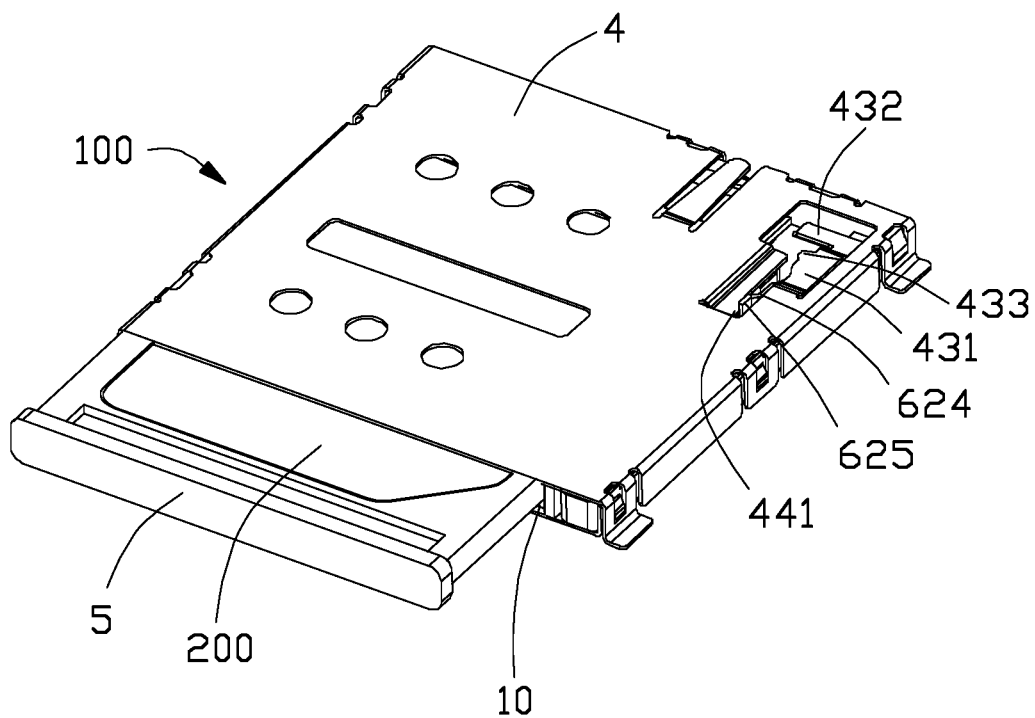
FIG. 1 is a perspective, assembled view of an electronic card connector.

Reference will now be made in detail to the preferred embodiment of the present invention.

Referring to FIGS. 1 to 7, an electronic card connector 100 of the present invention comprises an insulative housing 1, a plurality of terminals 2 and a metal sheet 3 affixed to the insulative housing 1, a shielding shell 4 attached to the insulative housing 1 and defining a receiving cavity 10 therebetween, a tray 5 for receiving/accompanying an electronic card 200 and an ejecting mechanism 6 located in the insulative housing 1 and received in the receiving cavity 10. The electrical connector 100 defines a card-inserting direction, a front end and a rear end in the referring to FIG. 1.

Figure 4:
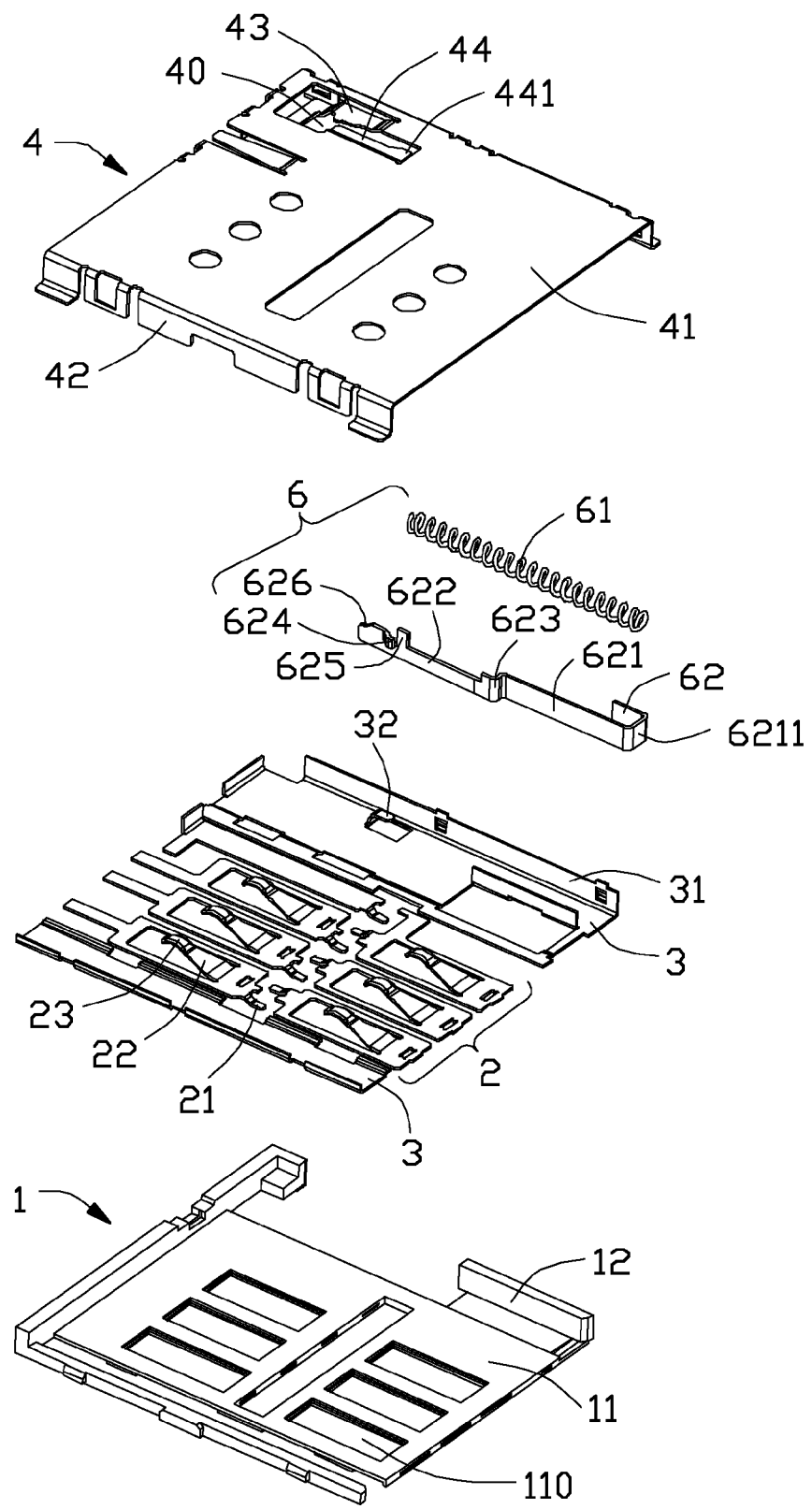
FIG. 4 is a perspective, exploded view of the electronic card connector with no tray.
Figure 5:
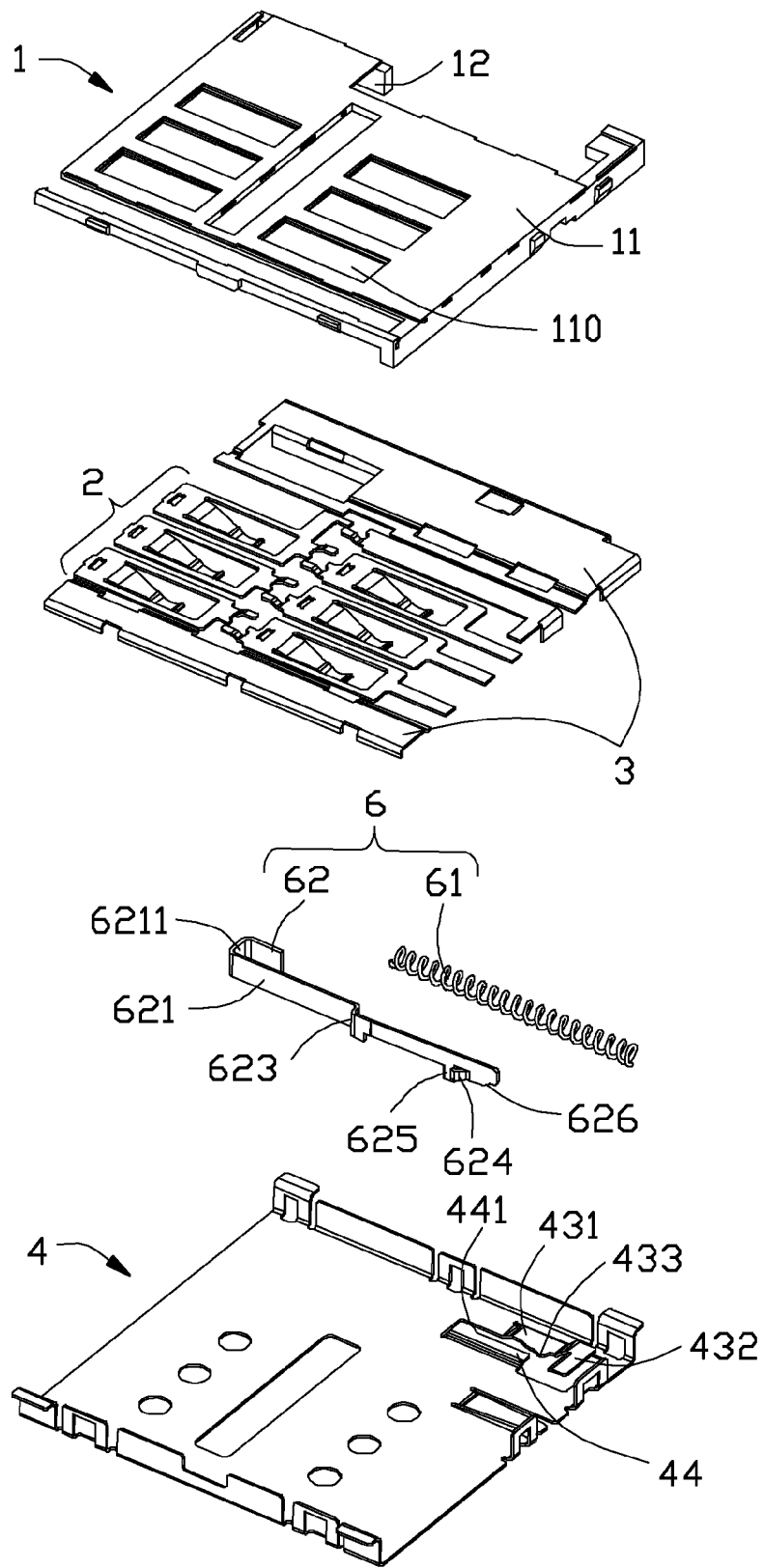
FIG. 5 is an another perspective, exploded view of the electronic card connector with no tray with respect to FIG. 4.

Referring to FIGS. 4 and 5, the insulative housing 1 comprises a base portion 11 and a side board 12 located in two sides of the base portion 11. The base portion 11 is formed with a number of receiving rooms 110 arranged in two rows.

The terminals 2 are located in two rows and received in the receiving rooms 110. Each terminal 2 comprises a soldering portion 21, a fixed portion 22 retained in the insulative housing 1 and a contacting portion 23 rising into the receiving cavity 10.

The metal sheet 3 is located in two sides of the terminals 2 and is formed with a side board 31 forming the receiving cavity 10 with the insulative housing 1 and a snagging arm 32.

Referring to FIGS. 1 to 5, the metal shell 4 includes a top wall 41 and a pair of side walls 42 extending downwardly from the top wall 41. The metal shell 4 further has an opening 40, an elastic part 43 located in the holding hole 42 and extending along the card-inserting direction from an inner edge of the holding hole 42, and a fixed part 44. The elastic part 43 includes a connecting part 431 and a holding part 432 extending along a card-inserting direction from a front end of the connecting part 431. The connecting part 431 is formed with a number of protrusions 433 extending to the opening 40. The holding part 432 is formed with a leading part (not labeled) rising therefrom. The width of the holding part 432 is bigger than that of the connecting part 431 along a left-to-right direction. The holding part 432 is located in front of the fixed part 44 along a fore-and-aft direction. A front end of the holding part 432 splits from the shielding shell 4. The elastic part 43 has a guiding part 434 rising from a rear edge of the holding part 432. The fixed part 44 extends along a fore-and-aft direction from an inner edge of the opening 40.

Figure 2:
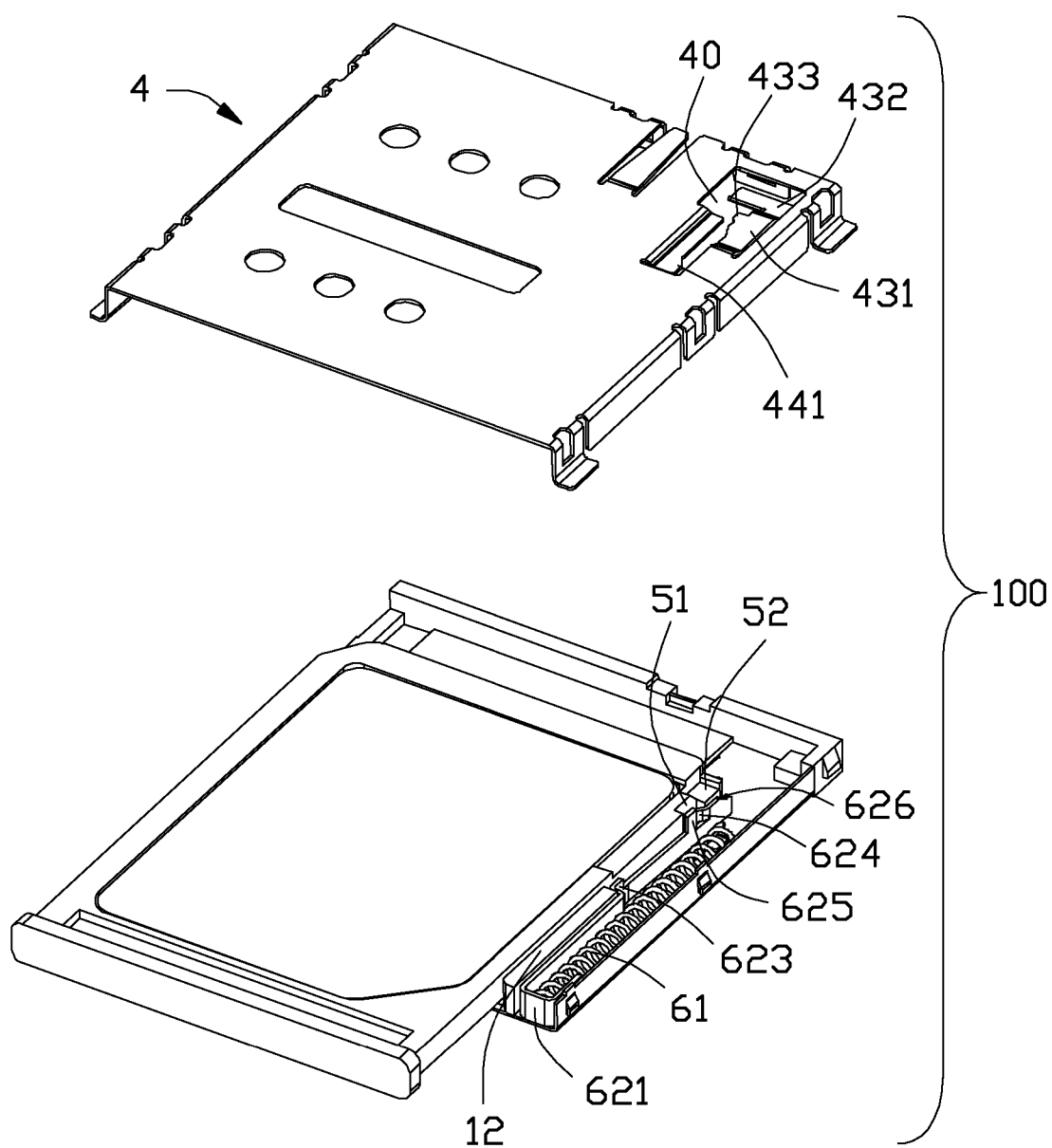
FIG. 2 is a perspective, assembled view of the electrical card connector with no shielding shell.
Figure 3:
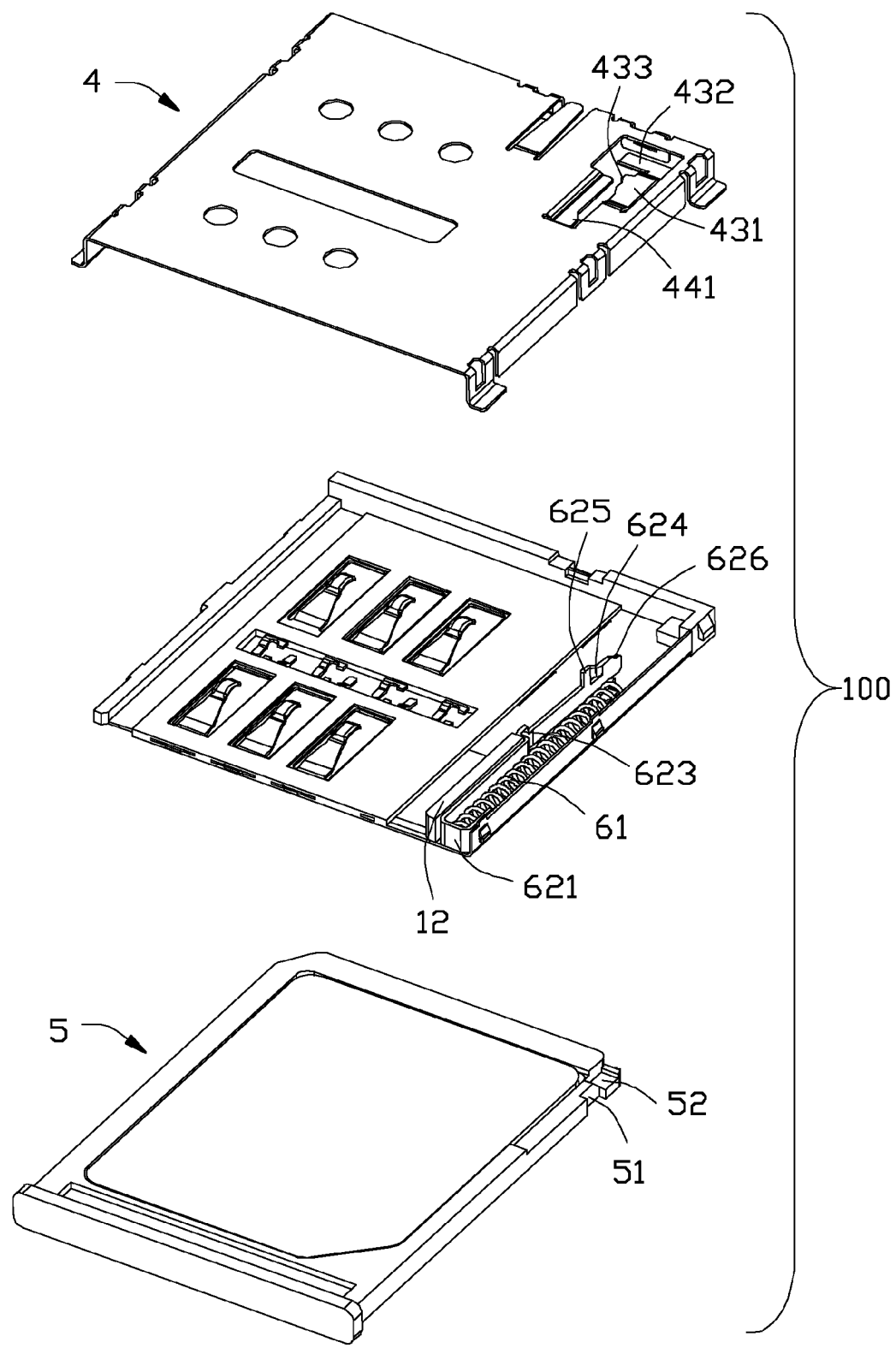
FIG. 3 is a perspective, partly exploded view of the electrical card connector.

Referring to FIGS. 2 to 3, the tray 5 is formed as a rectangle frame and has a notch 51 and a stepping part 52 engaged with the ejecting mechanism 6. The notch 51 is located in front of the stepping part 52. The stepping part 52 has an upstanding front edge. When the tray 5, i.e., the electronic card 200, is fully inserted into the electronic card connector 100, the holding part 432 is locked to the stepping part 52.

Referring to FIGS. 4 and 5, the ejecting mechanism 6 located in the metal sheet 3 is formed with a spring 61 affixed to the snagging arm 32 and a lever 62. The lever 62 is formed with an operating lever 621, an orienting lever 622 extending along a card-inserting direction, and a connecting lever 623 connecting the operating lever 621 with the orienting lever 622 and extending along a left-to-right direction. The operating lever 621 has an acting portion 6211 to receive a free end of the spring 61. A front end of the operating lever 621 extends along a card-inserting direction and is located in a right side of the orienting lever 622. The operating lever 621 is located beside the side board 12 and slides along the side board 12. The orienting lever 622 is formed with a buckling portion 624, a pushing portion 625 and a guiding portion 626 located in a free end of the buckling portion 624. A front end of the buckling portion 542 is connected with the orienting lever 622 forming a beveled surface thereof and the rear end dilates or splits from the orienting lever 622. The pushing portion 625 is located behind the buckling portion 624 and rises from the orienting lever 622. The pushing portion 625 slides in the opening 40 to make the lever 62 slide along a regular trajectory. The guiding portion 626 is located lower than the buckling portion 624 in an up-and-down direction and cooperated with the guiding part 434. The connecting lever 623 resists the side board 12 of the insulative housing 1. The buckling portion 624 and the pushing portion 625 are higher than the top wall 41 of the shielding shell 4.

Figure 6:
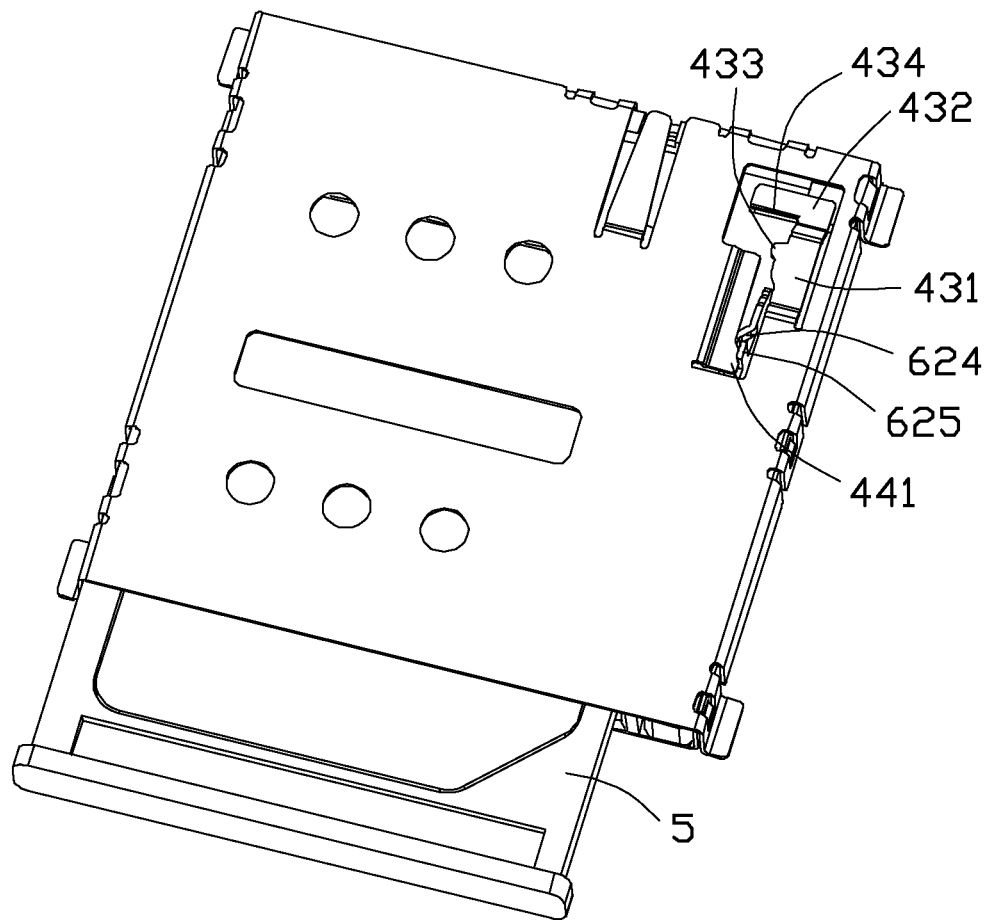
FIG. 6 is a cross-sectional view of the electrical card connector when an electronic card is inserted into the electronic card connector.
Figure 7:
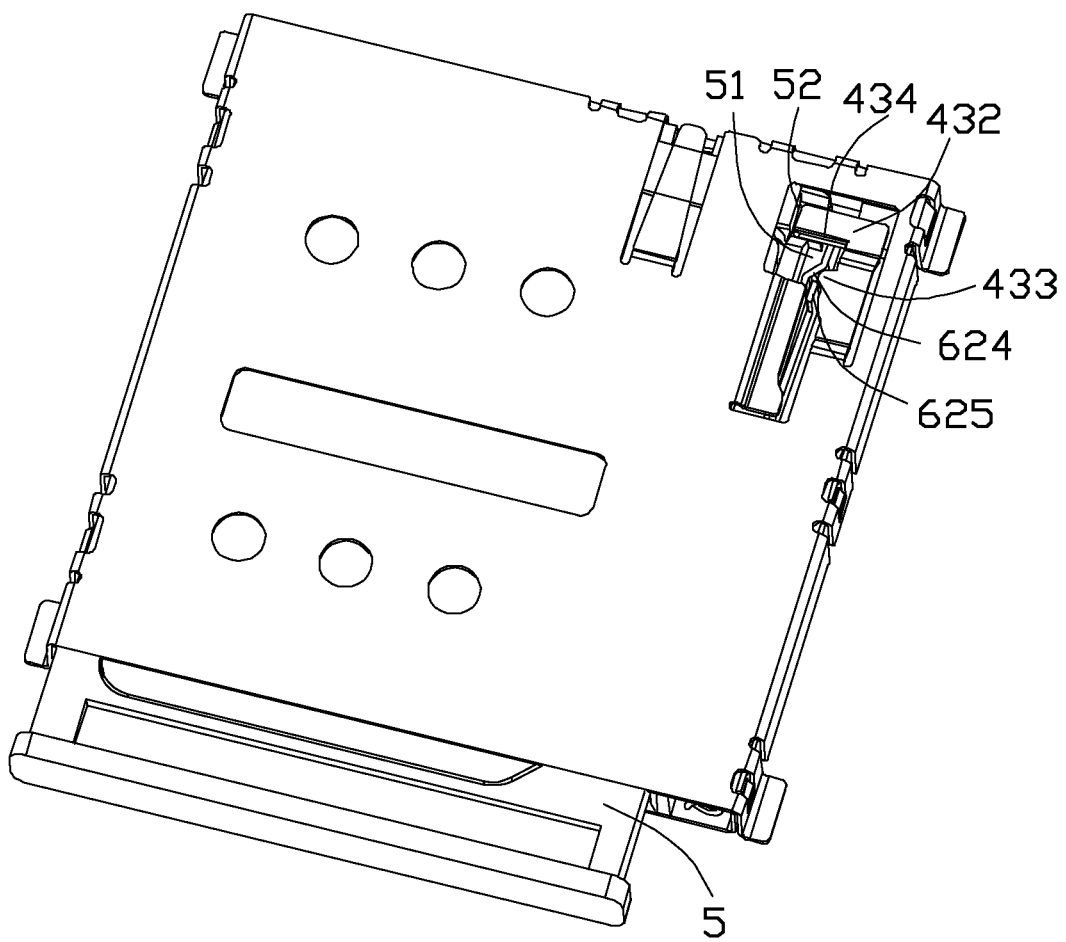
FIG. 7 is a cross-sectional view of the electrical card connector when an electronic card is ejected from the electronic card connector.

Referring to FIG. 6, the tray 5 is movable between an original position and a final position. Referring to FIG. 7, when the electronic card 200 is ejected, the operating lever 621 is driven by an external force to compress the spring 61 to move forwardly, and the protrusion 433 pushes the buckling portion 624 so that the notch 51 receives the buckling portion 624. The guiding portion 626 is guided by the guiding part 434 to slide under the holding part 432 to separate the holding part 432 from the stepping portion 52. Then the tray 5 is driven by the lever 62 under the resilience of the spring 62 to withdraw to the original position. The projecting part 441 pushes the pushing portion 625 outwardly to separate the buckling portion 624 from the notch 51.

The preferred embodiment of the present invention is that the ejecting mechanism 6 is cooperated with the elastic part 43 and the fixed part 44 to attain an efficient lock and ejection.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector comprising:
   an insulative housing defining a receiving cavity;
   a plurality of terminals retained in the insulative housing;
   a tray movable between an original position and a final position, said tray having a notch and a stepping part;
   a shielding shell attached to the insulative housing and having an elastic part, the elastic part having a holding part for latching with the stepping part at the final position; and
   an ejecting mechanism having a lever and a spring cooperated with the lever, the lever having a buckling portion, the lever being movable forwardly against the spring to disengage the holding part from the stepping part and to plunge the buckling portion into the notch, thereby permitting the tray together with the lever to return to the original position under a restoring force provided by the spring.

2. The electronic card connector as claimed in claim 1, wherein said elastic part has a protrusion, the protrusion pushing the buckling portion into the notch during ejecting the tray, the shielding shell has a projecting part located on a left side of the elastic part, and the lever is movable backwardly together with the tray to disengage the buckling portion from the notch.

3. The electronic card connector as claimed in claim 2, wherein said lever has a guiding portion, and the elastic part has a guiding part cooperating with the guiding portion to slide the lever.

4. The electronic card connector as claimed in claim 1, wherein said lever has a pushing portion located behind the buckling portion to lift the holding part away from the stepping part.

5. The electronic card connector as claimed in claim 4, wherein said shielding shell has an opening, and the pushing portion is slidable in the opening to move the lever along a regular trajectory.

6. The electronic card connector as claimed in claim 1, wherein said holding part extends along a left-to-right direction and has a guiding part at a rear edge thereof, a front end of the holding part splits from the shielding shell, a front end of the stepping part is higher than the guiding part, and the holding part is guided by the guiding part to locate in the stepping part and to resist the front end of the stepping part.

7. The electronic card connector as claimed in claim 1, wherein the lever has an orienting lever, a front end of the buckling portion is connected with the orienting lever, and a rear end of the buckling portion splits from the orienting lever.

8. The electronic card connector as claimed in claim 7, wherein said insulative housing has a side board, the lever has an operating lever and a connecting lever connecting the operating lever with the orienting lever, the operating lever has an acting portion, and the connecting lever resists against a front end of the side board.

\* \* \* \* \*